US008063600B2

(12) United States Patent
Kawata et al.

(10) Patent No.: US 8,063,600 B2
(45) Date of Patent: Nov. 22, 2011

(54) THERMALLY ACTUATED OVERLOAD TRIPPING DEVICE

(75) Inventors: Hisao Kawata, Takasaki (JP); Isamu Nagahiro, Ageo (JP); Motohiro Shimizu, Oosato (JP)

(73) Assignee: Fuji Electric Fa Components & Systems Co., Ltd., Tokyo (JP)

( * ) Notice: Subject to any disclaimer, the term of this patent is extended or adjusted under 35 U.S.C. 154(b) by 508 days.

(21) Appl. No.: 12/269,079

(22) Filed: Nov. 12, 2008

(65) Prior Publication Data

US 2009/0128077 A1 May 21, 2009

(30) Foreign Application Priority Data

Nov. 15, 2007 (JP) ................................ 2007-296199

(51) Int. Cl.
*H02P 1/04* (2006.01)

(52) U.S. Cl. .......................... 318/471; 318/475; 361/24

(58) Field of Classification Search .................. 318/471, 318/473, 475; 361/23, 24, 25, 93.2, 93.8, 361/103

See application file for complete search history.

(56) References Cited

U.S. PATENT DOCUMENTS

| | | | | |
|---|---|---|---|---|
| 5,901,025 | A * | 5/1999 | Takahashi et al. | 361/93.4 |
| 6,252,752 | B1 * | 6/2001 | Nagahama | 361/31 |
| 6,577,215 | B2 * | 6/2003 | Nomura et al. | 335/132 |
| 6,619,990 | B2 * | 9/2003 | Douglass et al. | 439/620.26 |
| 2005/0122642 | A1 * | 6/2005 | Plemmons et al. | 361/23 |
| 2006/0291121 | A1 * | 12/2006 | Rozine et al. | 361/93.9 |

FOREIGN PATENT DOCUMENTS

JP 2003-100195 4/2003

* cited by examiner

*Primary Examiner* — Rina Duda
(74) *Attorney, Agent, or Firm* — Rabin & Berdo, P.C.

(57) ABSTRACT

A circuit breaker with overload and short-circuit protection functions for a motor, on which is mounted a thermally actuated overload tripping device including an adjustment dial to set a value corresponding to a rated current value of the motor on a scale. The dial has a standard setting pointer mark and a correction setting pointer mark side-by-side along a perimeter. The standard setting pointer mark applies to using the circuit breaker as a single item. The correction setting pointer mark applies to using a number of circuit breakers arranged in a line in close contact with each other. By setting a mark selected according to the arrangement of the circuit breaker at the rated current value, the steady state current value of the tripping device can be adequately set to correspond to the rated current value of the motor.

5 Claims, 7 Drawing Sheets

THERMALLY ACTUATED OVERLOAD TRIPPING DEVICE

CROSS REFERENCE TO RELATED APPLICATION

This application claims priority from Japanese patent application serial number 2007-296199, filed on Nov. 15, 2007, the entire disclosure of which is incorporated herein by reference.

BACKGROUND OF THE INVENTION

1. Field of the Invention

The present invention relates to a circuit breaker that can be applied in a motor circuit for protecting a motor from overload and short-circuit, and in detail, to an adjustment dial for setting a steady state current value of a thermally actuated overload tripping device mounted on such a circuit breaker.

2. Background Art

It is known to use a type of circuit breaker commonly referred to as a “manual motor starter” for a switching device employed in a protecting and controlling circuit of a motor. The manual motor starter (abbreviated as “MMS”) is a circuit breaker compactly integrating the functions of a circuit breaker and a thermal relay (see JP-A-2003-100195, for example). Such a circuit breaker is ordinarily further combined with an electromagnetic contactor so as to carry out short-circuit and overload protection and operational control of a motor. An outline of the arrangement of the circuit breaker (MMS) is shown in each of FIGS. 4A, 4B and 5. FIG. 4A is a plan view showing a circuit breaker (MMS) with a case cover thereon, FIG. 4B is a plan view showing the inner mechanism of the circuit breaker (MMS) shown in FIG. 4A with the case cover removed, and FIG. 5 is a perspective view showing a unit assembly of a thermally actuated overload tripping device shown in FIG. 4B. Firstly, in FIGS. 4A and 4B, reference numerals 1 and 1*a* denote a main body case and case cover, respectively of a circuit breaker having a molded resin case. Reference numerals 2 and 3 respectively denote power source side terminals and load side terminals of the main body case 1. Reference numeral 4 denotes a switching mechanism carrying out a switching operation of a contact section of a main circuit. The switching operation of the switching mechanism 4 is performed by a lever 5 (a rocker system). Reference numeral 6 denotes an electromagnetic overload tripping device detecting a short-circuit current of the main circuit to instantaneously trip the circuit breaker, and reference numeral 7 denotes a thermally actuated overload tripping device detecting overload and open phase conditions to trip the circuit breaker. The contact section of the main circuit, though not shown, is incorporated in the main body case 1 on the bottom side thereof. Here, the thermally actuated overload tripping device 7, as shown in detail in FIG. 5, is a unitary assembly that combines a main bimetallic element 8 as a thermally actuated element corresponding to each phase in the main circuit, a differential shifter mechanism 9 including a differential lever linked to an operational end of the main bimetallic element 8, a push shifter and a pull shifter, a compensating bimetallic element 10 for ambient temperature compensation that also serves as a release lever linked to a latch catcher of the switching mechanism 4, with one end thereof made opposed to an output end 9*a* of the differential lever of the differential shifter mechanism 9, and an adjustment dial 11 for setting the steady state current value of the thermally actuated overload tripping device 7 to a capacity (rated current value) of a motor. In addition, for each phase, reference numeral 8*a* denotes a heater for heating the main bimetallic element 8.

The compensating bimetallic element 10 is held by a compensating bimetallic element holder 12*a*, which is pivotally held by a dial holder 12. The adjustment dial 11 is held by the dial holder 12 and is positioned so that the head of the adjustment dial 11 is aligned with an opening in the case cover 1*a* of the main body case 1 (see FIG. 4A) with a dial cam 11*e*, formed on the shaft of the adjustment dial 11, made to butt against the butting face (not shown) of the compensating bimetallic element holder 12*a*. FIG. 6A is a perspective view showing an adjustment dial mounted on the circuit breaker shown in FIGS. 4A and 4B, and FIG. 6B is a plan view showing an example of setting the setting pointer mark on the adjustment dial at a steady state current value in the circuit breaker. As shown in FIGS. 6A and 6B, the adjustment dial 11 has an arrow-shaped setting pointer mark 11*a* on the upper face of the head thereof. The setting pointer mark 11*a* is formed for setting a steady state current value with the setting pointer mark 11*a* to be set at the steady state current value on a current value scale 13 shown along a periphery of an opening in the case cover 1*a*. The setting pointer mark 11*a* is preferably formed as a slot into which the tip of a slotted screwdriver is inserted so as to turn the adjustment dial 11. A numeric character presented on the current value scale 13 represents the rated current value (A) of a motor. The setting range of the rated current value in the example shown in FIG. 6B is from 0.16 A to 0.25 A. The rated current value of the motor to be used is within this range in the example, and the setting is carried out so that the setting pointer mark 11*a* on the adjustment dial 11 is set at the rated current value. The operation and the function of the circuit breaker (MMS) is described in detail in the JP-A-2003-100195. Here, however, an explanation will be made relating to the thermally actuated overload tripping device 7. Specifically, when the circuit breaker is in actual use, the bending of the bimetallic element 8 heated by a current flow in a main circuit transfers the displacement due to the bending to the compensating bimetallic element 10 through the differential shifter mechanism 9. An overload state of the main circuit, that is, an increase in the current value in the main circuit larger than the steady state current value set beforehand by the adjustment dial 11, increases the displacement due to the bending of the main bimetallic element 8. The increased displacement due to this bending causes the output end 9*a* of the differential shifter mechanism 9 to push the compensating bimetallic element 10 to release the engagement between a latch and a latch catcher in the switching mechanism 4. This causes the switching mechanism 4 to be tripped to open the contact section in the main circuit.

The adjustment dial 11 is provided to set the steady state current value to the rated current value of a motor. The setting of the setting pointer mark 11*a* of the adjustment dial 11 shown in FIG. 6B at the position on the current value scale 13 corresponding to the rated current value of the motor, by turning the adjustment dial 11, causes the compensating bimetallic element holder 12*a* to turn on the dial holder 12 through the medium of the dial cam 11*e* of the adjustment dial 11. This displaces one end of the compensating bimetallic element 10 to cause play between the compensating bimetallic element 10 and the output end 9*a* of the differential shifter mechanism 9 to vary to be adjusted in correspondence with the set current value.

When the rated current adjustable circuit breaker (MMS) is used in a panel such as a control panel, the overload protection characteristic of the circuit breaker varies depending on how it is arranged. More specifically, the amount of bending of the main bimetallic element 8, as a thermally actuated element of the thermally actuated overload tripping device 7 contained in the main body case 1 of the circuit breaker, depends on the temperature of the bimetallic element. More specifically, the amount of bending depends on the temperature of the bimetallic element raised by applying an electric current to the bimetallic element. The temperature of the bimetallic element at this time varies according to ambient temperature conditions and, besides this, also according to the heat dissipation characteristic of the main body case 1 of the circuit breaker for dissipating the heat into the surroundings therefrom. The following is a comparison of the case of using one circuit breaker as a single item with the case of using a plurality of circuit breakers laterally arranged in line with adjacent ones in close contact with each other without providing any spacing. In the latter case, the heat dissipation from the main body case 1 of each circuit breaker is prevented by main body cases of the adjacent circuit breakers on the right and left sides lowering the heat dissipation characteristic of the main body case 1. This causes generated heat to be stored in the main body case 1 to excessively raise the temperature of the main bimetallic element 8, which results in a large amount of bending of the main bimetallic element 8. In such a state, even though the current value of the main circuit (the load current value of the motor) is equal to or less than the steady state current value set beforehand with the adjustment dial 11, there is a possibility of causing the thermally actuated overload tripping device 7 to be operated to accidentally bring the main circuit of the circuit breaker to an opened state, which causes an emergency stop in operation of the motor, to making adequate operational control impossible.

The circuit breaker as a product is provided so that steady state current values shown on the current value scale 13 are determined on the basis of the operating arrangement for a single item and an ambient temperature of 20° C. Thus, in the instruction manual accompanying a product delivered from the manufacturer, a caution is given such as "provide sufficient spacing between adjacent circuit breakers when mounting a plurality of circuit breakers in the same panel." Nevertheless, in some cases in which mounting of additional circuit breakers is carried out by the user, limited space in a control panel may make it necessary to mount a plurality of circuit breakers on a mounting rail in the panel arranged in line with adjacent ones in close contact with each other and little spacing provided in between. The use of the circuit breakers in such an arrangement introduces a possibility of causing malfunction of the thermally actuated overload tripping device to accidentally bring the main circuit of the circuit breaker to an opened state even though the load current value of the main circuit is equal to or less than the steady state current value set beforehand. As was explained in relation to FIG. 5, the related thermally actuated overload tripping device 7 is provided with the compensating bimetallic element 10 to reduce the influence of variations in ambient temperature (standard temperature: 20° C.) on the operating characteristics of the circuit breaker. The compensating bimetallic element 10, however, has a limitation in its functionality. More particularly, in the arrangement of rated current adjustable circuit breakers (MMSs), in each of which the steady state current value is set at the rated current value of a motor by means of the adjustment dial, in line in a panel with adjacent ones in close contact with each other, there is a possibility that the compensating bimetallic element 10 cannot by itself prevent the malfunction of the thermally actuated overload tripping device 7 to accidentally bring the main circuit of the circuit breaker to an opened state.

In one method that can be used to counter this problem, an adequate correction value for a steady state current is calculated on the basis of a relation between the temperature rise of the main bimetallic element and its operation characteristic, which relation varies depending on whether a single item of the circuit breaker is used or a plurality of the circuit breakers are arranged with adjacent ones in close contact with each other, and the adjustment dial is reset to the corrected value. This measure, however, is troublesome and additionally necessitates expert knowledge. Thus, such a measure cannot be commonly applied. The invention was made in view of the foregoing with an object of providing a circuit breaker which is capable of adequately setting the steady state current value of a thermally actuated overload tripping device by a simple adjustment dial operation of only setting a setting pointer mark at the steady state current value on a current value scale corresponding to the capacity of a motor, whether one circuit breaker is used as a single item or a plurality of circuit breakers are arranged in line with adjacent ones in close contact with each other.

SUMMARY OF THE INVENTION

In order to achieve the above object, according to the invention, in a circuit breaker provided with an overload protection function applied to a motor circuit, a thermally actuated overload tripping device is mounted thereon including a thermally actuated element and an adjustment dial setting a stable state current value corresponding to the rated current value of the motor at a current value shown on a current value scale, the adjustment dial has a standard setting pointer mark and a correction setting pointer mark to be marked side by side thereon along the perimeter thereof, the standard setting pointer mark being applied to the case of using the circuit breaker while being arranged as a single item, and the correction setting pointer mark being applied to the case of using a plurality of the circuit breakers while being arranged in line with adjacent ones made in close contact with each other. In a preferred embodiment, the setting pointer marks are arranged as follows.

(1) The correction setting pointer mark marked on the adjustment dial is provided at a correction angle with the standard setting pointer mark, the correction angle corresponding to a difference in temperature rise of the thermally actuated element in the thermally actuated overload tripping device between the arrangement of the circuit breaker as a single item and the arrangement of a plurality of the circuit breakers with adjacent ones in close contact with each other.

(2) The standard setting pointer mark formed on the adjustment dial is provided as an arrow mark in a slot-shape and the correction setting pointer mark formed on the adjustment dial is marked as a protruding mark.

(3) The standard setting pointer mark and the correction setting pointer mark additionally have their respective character marks for identification marked on the adjustment dial.

According to a preferred embodiment, when mounting the circuit breaker in a panel, either one of the standard setting pointer mark or the correction setting pointer mark is selected according to the arrangement of the circuit breaker (the arrangement as a single item or the arrangement with a plurality of items with adjacent ones in close contact with each other) and the selected mark is set at the current value on the current value scale corresponding to the rated current value of a motor. This compensates thermal influence due to differences in arrangement of the circuit breaker to make it possible to adequately prevent a motor from overload with an operation characteristic made to depend on heating caused by conducting the main circuit current. Therefore, the main circuit of the circuit breaker can be prevented from being accidentally brought to an opened state even in the case in which a plurality of the circuit breakers are arranged with adjacent ones in close contact with each other, with a stable state current value adequately corrected and set only by a simple dial operation without any effort of carrying out troublesome correction calculations. Moreover, in contrast with the standard setting pointer mark formed into a slot, the correction setting pointer mark formed into a projecting shape allows the respective marks to be distinguished from each other with high visibility. With character marks for identification further used in combination with the setting pointer marks, the visibility is furthermore enhanced.

DESCRIPTION OF THE PREFERRED EMBODIMENT

Figure 1:
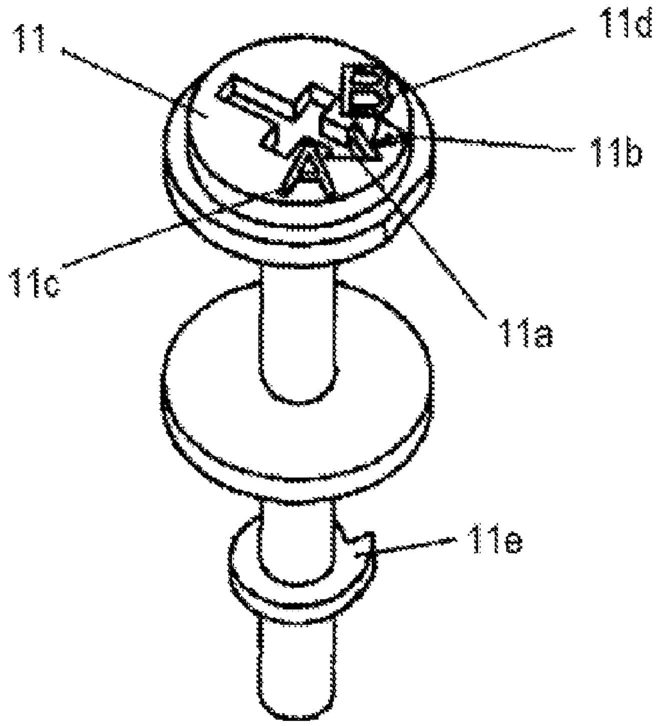
FIG. 1 is a perspective view showing an adjustment dial according to an example of the invention.
Figure 2A:
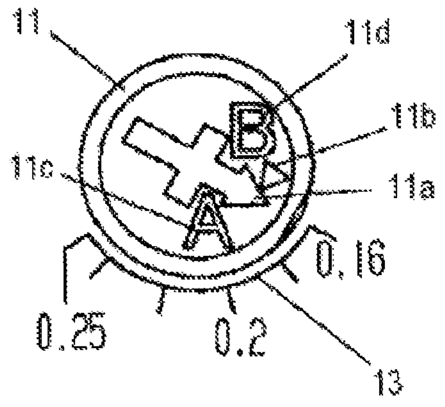
FIG. 2A is a plan view showing the state of setting a stable state current value by the adjustment dial shown in FIG. 1 in a circuit breaker arranged as a single item.
Figure 2B:
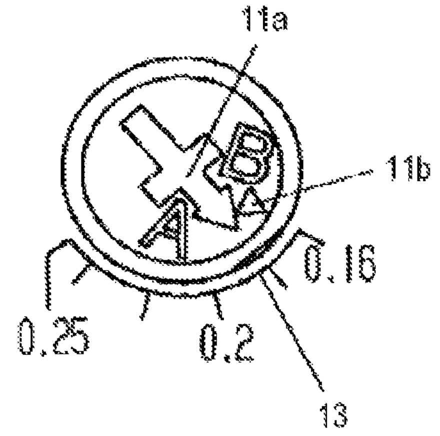
FIG. 2B is a plan view showing the state of setting a stable state current value by the adjustment dial shown in FIG. 1 in each of a plurality of circuit breakers arranged in line with adjacent ones in close contact with each other.
Figure 3A:
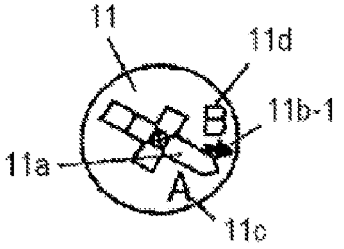
FIGS. 3A-D are plan views showing modified examples of correction setting pointer marks according to the invention with shapes thereof different from one another.
Figure 3B:
Figure 3C:
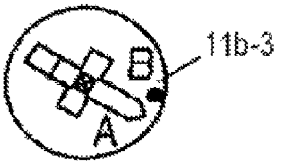
Figure 3D:
Figure 6A:
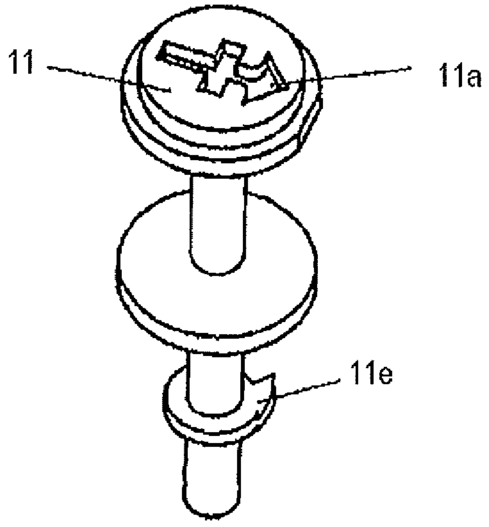
FIG. 6A PRIOR ART
FIG. 6A is a perspective view showing an adjustment dial mounted on the circuit breaker shown in FIGS. 4A and 4B.
Figure 6B:
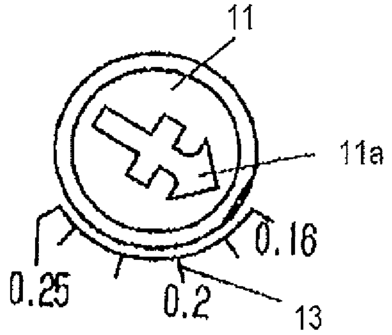
FIG. 6B PRIOR ART
FIG. 6B is a plan view showing an example of setting the setting pointer mark on the adjustment dial at a steady state current value in a circuit breaker.

In the following description, a preferred embodiment of the invention will be explained on the basis of an example shown in FIG. 1 to FIG. 3. Here, FIG. 1 is a perspective view showing an adjustment dial according to the example, FIG. 2A is a plan view showing the state of setting a stable state current value by the adjustment dial shown in FIG. 1 in a circuit breaker arranged as a single item, FIG. 2B is a plan view showing the state of setting a stable state current value by the adjustment dial shown in FIG. 1 in each of a plurality of circuit breakers arranged in line with adjacent ones in close contact with each other, and FIGS. 3A-D are plan views showing modified examples of correction setting pointer marks according to the invention with different shapes of setting pointer marks. In FIGS. 3A-D, elements corresponding to those in FIGS. 6A and 6B are denoted by the same reference numerals and signs. Firstly, in the adjustment dial 11 in the example shown in FIG. 1 and in FIGS. 2A and 2B, on an upper surface of a head of the adjustment dial 11, a standard setting pointer mark 11*a*, being an arrow-shaped slot as shown in FIGS. 6A and 6B, and a triangular correction setting pointer mark 11*b* are formed. The correction setting pointer mark 11*b* is formed at an angle to the direction of the head of the arrow of the standard setting pointer mark 11*a* so that the head of the correction setting pointer mark 11*b* points to a current value different from that pointed to by the standard setting pointer mark 11*a* on the current value scale 13. Furthermore, in addition to the standard setting pointer mark 11*a* and the correction setting pointer mark 11*b*, character marks for identification 11*c* and 11*d* (e.g. characters "A" and "B" in the illustrated example) corresponding to the marks 11*a* and 11*b* are marked at the sides of the marks 11*a* and 11*b*, respectively. Here, the standard setting pointer mark 11*a* is to be applied to the case of using the circuit breaker arranged as a single item, while the correction setting pointer mark 11*b* is to be applied to the case of using a plurality of circuit breakers arranged in line with adjacent ones in close contact with each other. The correction setting pointer mark 11*b* is provided at a correction angle with respect to the standard setting pointer mark 11*a* for the current value scale, where the correction angle is obtained as follows.

Figure 4A:
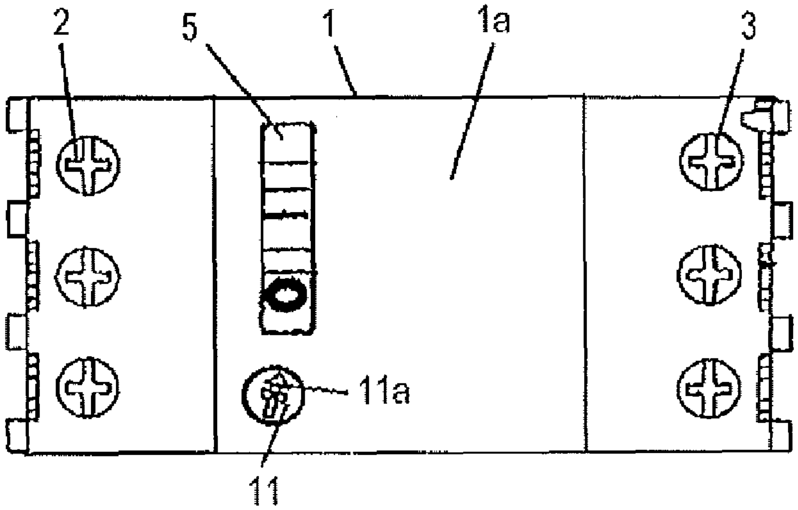
FIG. 4A PRIOR ART
FIG. 4A is a plan view showing a circuit breaker (MMS) with a case cover thereon.
Figure 4B:
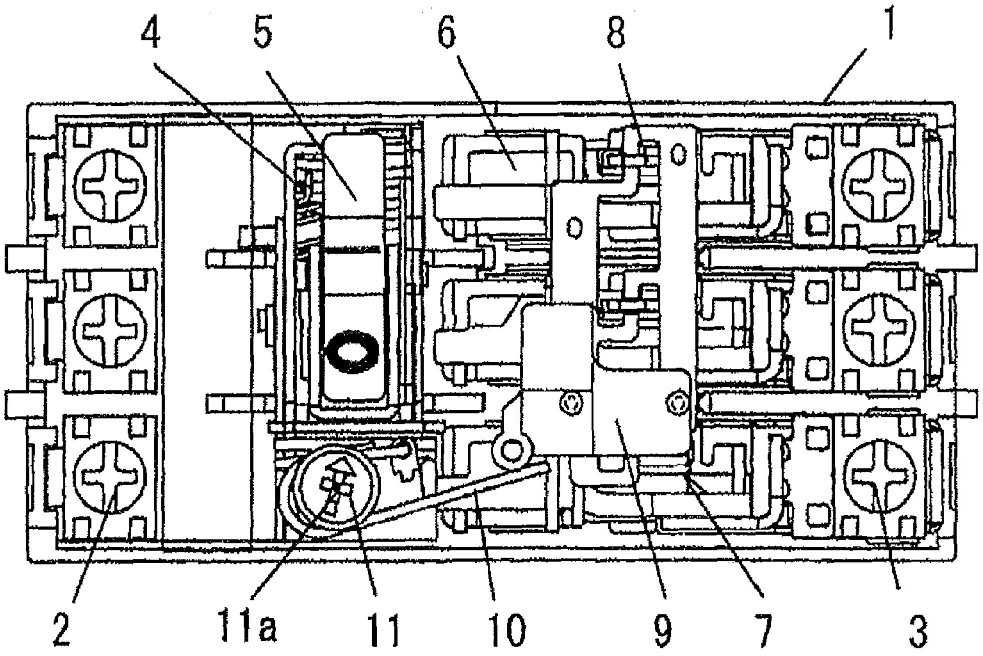
FIG. 4B PRIOR ART
FIG. 4B is a plan view showing the inner mechanism of the circuit breaker (MMS) shown in FIG. 4A with the case cover removed.
Figure 5:
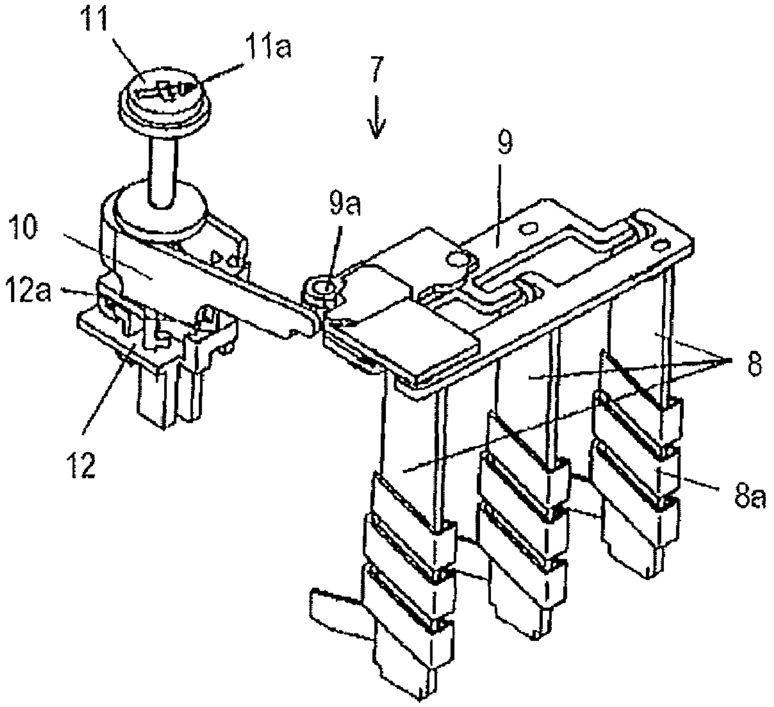
FIG. 5 PRIOR ART
FIG. 5 is a perspective view showing a unit assembly of a thermally actuated overload tripping device shown in FIG. 4B.

The difference in temperature rise of the main bimetallic element 8 (see FIGS. 4A and 4B and FIG. 5) due to a difference in operating arrangement between a circuit breaker arranged as a single item and a plurality of circuit breakers arranged in line with adjacent ones in close contact with each other is investigated beforehand by carrying out tests with actual devices. As has been described in the foregoing, in the arrangement where a plurality of the circuit breakers are laterally arranged with adjacent ones in close contact with each other, the temperature rise of the main bimetallic element due to heating by conducting a current becomes higher by an amount of the reduction in heat dissipation of the circuit breaker compared with the temperature rise when a circuit breaker is arranged as a single item. The difference in temperature rise is converted to a current value to calculate an adequate steady state current value to be corrected. Then, on the basis of the correction value of the steady state current value obtained by the investigation, the position of the correction setting pointer mark 11*b* is determined at which marking of the correction setting pointer mark 11*b* is performed. This brings the head of the standard setting pointer mark 11*a* (arrow-shaped mark) to point to a corrected stable state current value only by setting the correction setting pointer mark 11*b* at the scale corresponding to the rated current value of a motor on the current value scale 13. Moreover, the correction setting pointer mark 11*b*, contrary to the slot-like standard setting pointer mark (arrow-shape) 11*a*, may be formed as a projection and/or colored differently from the surrounding color for enhanced visibility. In the same way, the character marks 11*c* and 11*d* may be formed as projecting marks and/or colored. Following this, examples of the specific adjustment methods of the adjustment dial 11 will be explained with reference to FIGS. 2A and 2B. FIGS. 2A and 2B correspond to the arrangement of a single item of the circuit breaker and the arrangement of a plurality of circuit breakers in line with adjacent ones in close contact with each other, respectively. In the specific examples, the range of the current value, corresponding to the rated current value of a motor, shown on the current value scale 13 presented along the adjustment dial 11 is between 0.16 A and 0.25 A like the scale shown in FIG. 6 and the rated current value of the motor, to which the circuit breaker applied, is taken as 0.16 A. When the circuit breaker is used while being arranged as a single item, the steady state current value of the thermally actuated overload tripping device is set with the head of the arrow of the standard setting pointer mark 11*a* set at the scale mark of 0.16 A on the current value scale 13 as shown in FIG. 2A. When a plurality of the circuit breakers are used while being arranged in line with adjacent ones in close contact with each other, the correction setting pointer mark 11*b* is selected and the head of the correction setting pointer mark 11*b* is set at 0.16 A on the current value scale 13 as shown in FIG. 2B.

Thus, even when a plurality of circuit breakers are used while arranged in line with adjacent ones in close contact with each other, the influence of excess bending of the main bimetallic element caused by excess temperature rise thereof due to reduction in heat dissipation characteristics of the circuit breakers is compensated to allow adequate overload protection of a motor to be carried out by setting the same steady current value as that set for the circuit breaker arranged as a single item. In addition, the correction for a set current value due to the change in the form of arrangement of the circuit breaker can be adequately carried out by a simple operation of only selecting a mark on the adjustment dial 11 and setting the mark at a numeric character on the current value scale 13 corresponding to the rated current value of the motor. Moreover, the standard setting pointer mark 11*a* marked on the adjustment dial 11 may be provided in a slot-shape that can be turned by a slotted screwdriver. Contrary to this, by forming the correction setting pointer mark 11*b* as a projection, high visibility can be obtained for a mark to be selected, by which an erroneous setting operation of the adjustment dial 11 can be prevented. In the example shown in FIG. 1 and FIGS. 2A and 2B, the correction setting pointer mark 11*b* was triangular. The form of the mark, however, is not limited to a triangular shape, but can be modified into an arrow, a line, a circle or an arbitrary polygon as shown in FIGS. 3A-D, respectively.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A thermally actuated overload tripping device mounted for a circuit breaker with an overload protecting function to protect a motor, the thermally actuated overload tripping device comprising:

a thermally actuated element; and an adjustment dial configured to set a stable state current value corresponding to a rated current value of the motor at a value shown on a scale, wherein the adjustment dial has a standard setting pointer mark and a correction setting pointer mark marked side-by-side thereon along the perimeter thereof, the standard setting pointer mark is configured to be used in a case of using the circuit breaker arranged as a single item, and the correction setting pointer mark is configured to be used in a case of using a plurality of the circuit breakers arranged in line with adjacent ones of the circuit breakers in contact with each other.

2. The tripping device as in claim 1, wherein the correction setting pointer mark is provided at a correction angle with respect to the standard setting pointer mark, the correction angle corresponding to a difference in temperature rise of the thermally actuated element in the thermally actuated overload tripping device between the case of using the circuit breaker as a single item and the case of arranging a plurality of the circuit breakers with adjacent ones of the circuit breakers in contact with each other.

3. The tripping device as in claim 1, wherein the correction setting pointer mark protrudes from the adjustment dial.

4. The tripping device as claimed in claim 3, wherein respective character marks to identify the standard setting pointer mark and the correction setting pointer mark are marked on the adjustment dial.

5. The tripping device as claimed in claim 1, wherein respective character marks to identify the standard setting pointer mark and the correction setting pointer mark are marked on the adjustment dial.

* * * * *